March 1, 1938.    E. NIELSEN    2,109,732
MOTOR SPEED CONTROLLER
Filed Aug. 15, 1936    3 Sheets-Sheet 1

Inventor:
Emanuel Nielsen
By Bertha L. MacGregor
Attorney

Inventor:
Emanuel Nielsen
By Bertha L. MacGregor
Attorney

March 1, 1938.   E. NIELSEN   2,109,732
MOTOR SPEED CONTROLLER
Filed Aug. 15, 1936   3 Sheets-Sheet 3
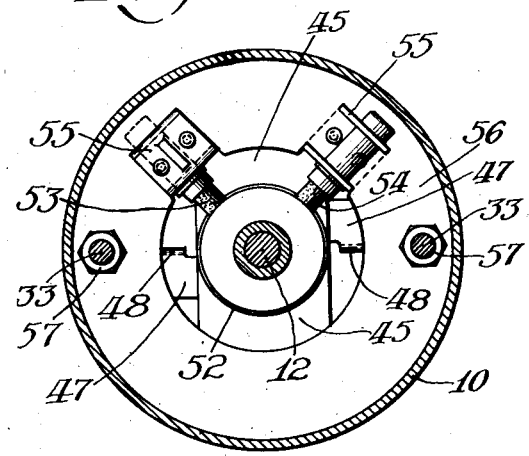
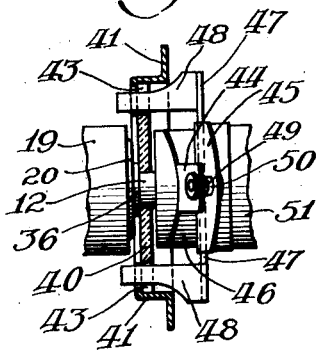
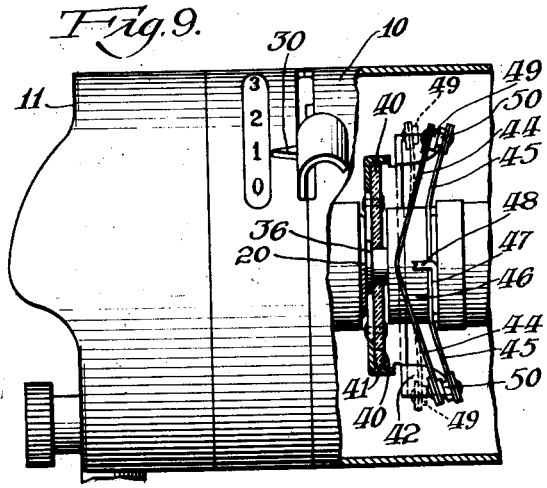
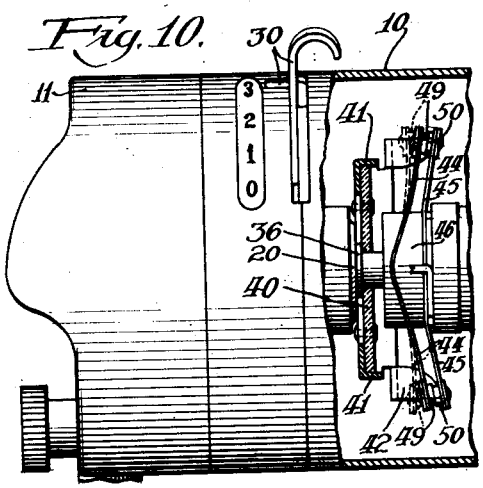
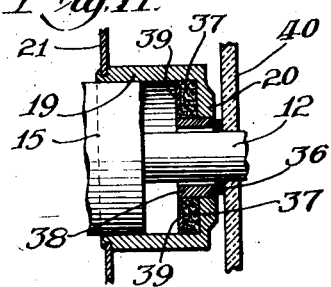
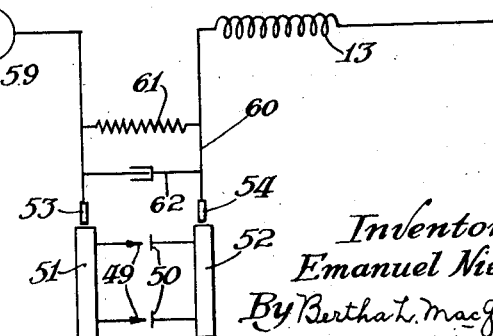
Inventor:
Emanuel Nielsen
By Bertha L. MacGregor
Attorney Patented Mar. 1, 1938

2,109,732

UNITED STATES PATENT OFFICE 2,109,732

MOTOR SPEED CONTROLLER

Emanuel Nielsen, Racine, Wis., assignor to Scovill Manufacturing Company, Waterbury, Conn., a corporation of Connecticut Application August 15, 1936, Serial No. 96,214

9 Claims. (Cl. 200—80)

This invention relates to motor speed controlling mechanism, and particularly to centrifugally influenced means for governing motor speeds. As herein shown and described, the invention is embodied in a food mixer motor, but it may be used in motors for other devices.

The main object of the invention is to provide a speed controlling device capable of governing the operation of a motor shaft at a wide range of controlled speeds. For example, food mixer motors are operated at 5400 to 18,000 R. P. M. in order to produce beater rotations of 300 to 1000 R. P. M. Therefore, an efficient speed controlling device must be capable of functioning over the wide range of speeds required in a food mixer.

Another object is to provide means for minutely adjusting the speed controlling mechanism to render it automatically operable to maintain the speed of the motor at any one of a plurality of predetermined speeds within a wide range of speeds.

Another object of the invention is to provide speed controlling means which shall not affect the true balance of the motor armature or that part to which the control means is attached.

Another object is to provide novel and efficient lubricating means for the speed controlling mechanism.

In the drawings:

Fig. 7 is a transverse, vertical sectional view taken in the plane of the line 7—7 of Fig. 1.

Fig. 8 is a sectional view partly in elevation, of a part of the speed controlling mechanism shown in Figs. 1 and 2, taken on the line 8—8 of Fig. 1.

Fig. 9 is a side elevation, partly in section, of the left hand portion of Fig. 1, showing in full and dotted lines, two low speed positions of part of the speed control mechanisms.

Fig. 10 is a view similar to Fig. 9, showing in full and dotted lines two high speed positions of part of the speed control mechanisms.

Fig 11 is an enlarged view of a part of Fig. 1.

Fig. 12 is a diagram of the wiring of the motor and speed controlling mechanism.

Figure 1:
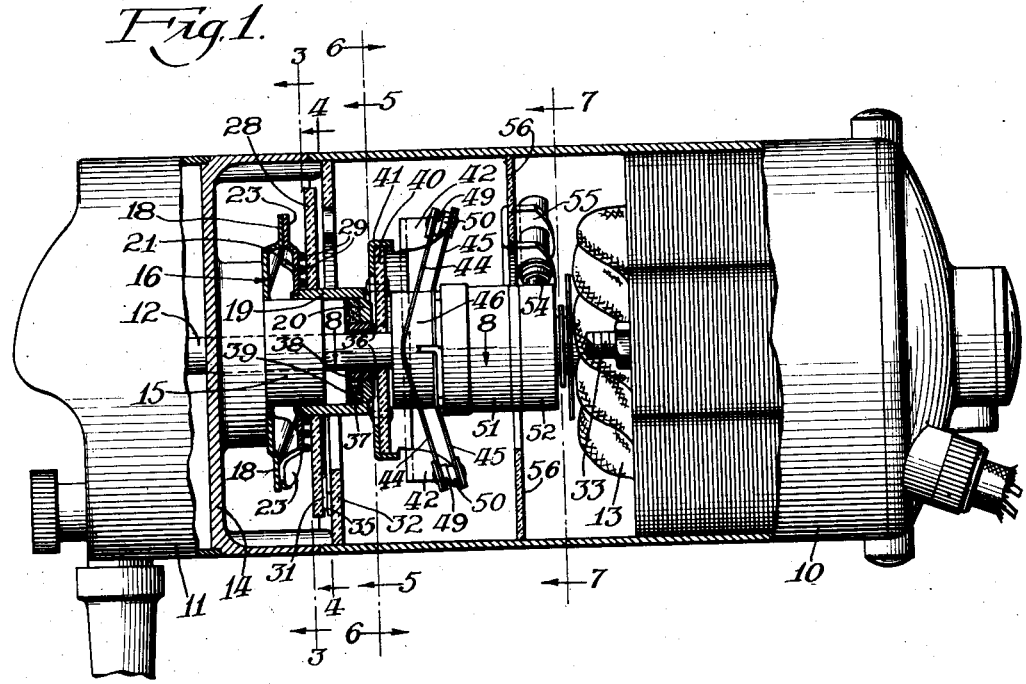
Fig. 1 is a longitudinal, vertical sectional view, partly in elevation, of a motor and speed controlling mechanism embodying my invention.
Figure 2:
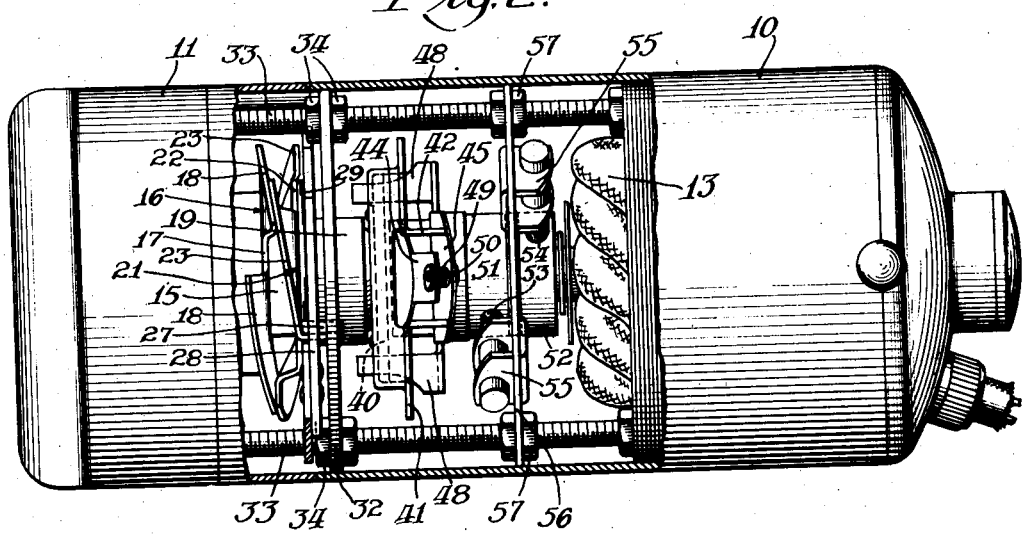
Fig. 2 is a plan view, partly in elevation, of the parts shown in Fig. 1.

In that form of the invention shown in the drawings, the speed controlling mechanism is embodied in a food mixer motor casing 10, which has attached to it a gear casing 11, into which extends the motor shaft 12. Field coils are indicated at 13.

The end cover 14 of the motor casing, which separates the motor and gear chambers, is provided with a centrally apertured hub 15 which serves as a bearing for the shaft 12 and carries a disc 16 peripherally slit or cut away at three places 17. The disc is flat except in the peripheral portions, where the surfaces 18 of the disc between the slits 17 are each inclined in a circumferential direction, and each of said surfaces intersects the plane of the disc face. The hub 15 and disc 16 are fixed relatively to the end cover 14.

Figure 3:
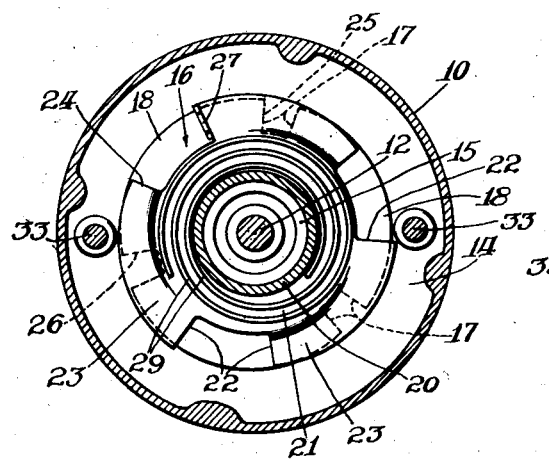
Fig. 3 is a transverse sectional view taken in the plane of the line 3—3 of Fig. 1.
Figure 4:
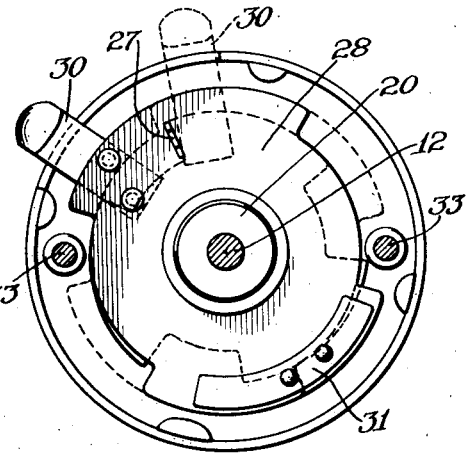
Fig. 4 is a transverse sectional view taken in the plane of the line 4—4 of Fig. 1.
Figure 5:
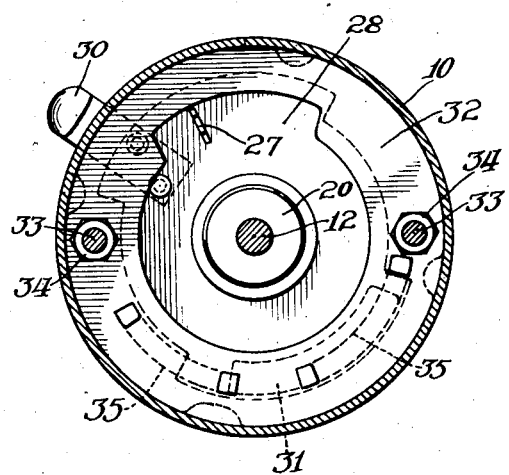
Fig. 5 is a transverse sectional view taken in the plane of the line 5—5 of Fig. 1.

A cup-shaped hub comprising a cylindrical portion 19 and a centrally apertured end 20 is loosely mounted on the motor shaft 12, with its cylindrical portion 19 surrounding the hub 15. A disc 21 is rigidly secured to the part 19 of the hub. Said disc 21 is peripherally cut away at 22 leaving intermediate peripheral portions 23, inclined in a circumferential direction and complemental to the surfaces 18 of the disc 16. The proximate faces of the discs 16 and 21 and the inclined surfaces 18 and 23 are substantially parallel, and, therefore, the actuation of the disc 21 relatively to the disc 16 causes the inclined surfaces 23 to ride up or down on the inclined surfaces 18, thereby varying the axial distance between the discs 16 and 21 and hubs 15 and 19. In Fig. 3 the disc 21 is shown in a position intermediate the two extremes, that is, the low portion 24 of one of the surfaces 23 is bearing on a surface 18 between its low portion 25 and high portion 26. When the portion 24 of the disc 21 is opposite the portion 25 of the disc 16, the discs and their hubs will be axially close together, and when the part 24 of the surface 23 of the disc 21 approaches the part 26 of the inclined surface 18 of the disc 16, the discs and their hubs will be axially spaced apart for a purpose to be explained.

An ear 27 projects from one of the surfaces 23 of the disc 21, at right angles to the disc, for engaging a slot in an indicator disc 28 rotatably mounted on the hub 19 on the shaft 12. A spring 29 is preferably interposed between the indicator disc 28 and disc 21. The disc 28 of insulating material carries an indicator 30 which projects through a slot in the casing 10 (Figs. 9 and 10). When the indicator 30 is manually adjusted to indicate desired speed, the movement of the disc 28 actuates the disc 21 by means of the ear 27 which engages the disc 28.

The indicator disc 28 has connected to it a spring metal contact member 31. A ring 32 of insulating material is fixedly mounted in the casing 10 by means of the rods 33 and nuts 34, adjacent the indicator disc 28. Said ring 32 has connected to it two electrical contact members 35, 35, which are engaged by the contact member 31 when the indicator 30 is in certain positions. While the ring 32 is fixedly mounted in the casing 10, the hub 19—20 and attached disc 21 are movable axially of the shaft 12, the said hub projecting through the central opening of the ring 32.

Next to the hub part 20 is a washer 36, the lubrication of which is assured by means located in the hub 19—20. Said lubricating means comprise a felt washer 37 pressed against the hub part 20, between the cylindrical part 19 of the hub and a bearing sleeve 38 of coarse material, oil impregnated, which is rigidly connected to or integral with the part 20 of the hub. A spider type washer 39 retains the felt washer in place in the hub 19—20. The felt washer absorbs excess oil from the hub 15 in which the armature shaft has bearing, and lubricates the point of contact between the bearing sleeve 38 and washer 36 for a long time. The lubrication of the washer 36 is essential because it is located between the hub member 20 (rotated only when the indicator 30 is being actuated) and a rotated member about to be described, against which the hub 20 and washer 36 bear.

Figure 6:
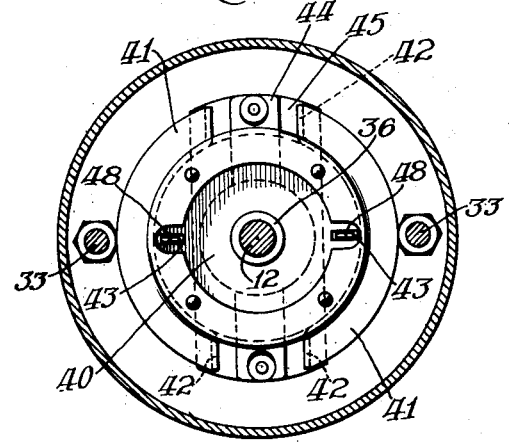
Fig. 6 is a transverse sectional view taken in the plane of the line 6—6 of Fig. 1, said plane being the same as that of Fig. 5, but looking in the opposite direction.

The rotated member just mentioned comprises a fibre disc 40, loosely mounted on the armature shaft 12, and a peripheral, offset ring 41 secured to the fibre disc 40. The ring 41 is slit at two opposite places, and the metal of the ring is bent at right angles to the ring surface to form four ears 42. The fibre disc is provided with two slots 43 (Fig. 6) adapted to receive ears which are part of a centrifugally influenced contact assembly (hereinafter described), fixed to the shaft 12 and rotatable therewith, whereby the fibre disc 40 with its attached ring 41 is rotated with the contact assembly but is free to move axially of the shaft 12 when actuated by the hub 19—20 by adjustment of the indicator disc 28.

The centrifugally influenced contact assembly is fixedly mounted on the shaft 12. It comprises a pair of resilient, spring metal arms 44, 45, insulated from each other at 46, said arms each extending radially in opposite directions from the shaft 12. The arm 44 is bent between its ends so that the opposite ends are normally inclined toward the right as viewed in Figs. 1, 9 and 10, to bear on the arm 45. The ends of the arm 45 are influenced to assume the inclined angles of the ends of the arm 44, due to the tension of the bent arm 44 bearing on the ends of said arm 45, but when freed of said pressure the arm 45 tends to assume a position in a substantialy vertical plane. A bracket 47, also a fixed part of the controller assembly, is bent to form ears 48, 48, which enter the slots 43 of the rotated disc member 40—41 and cause it to rotate with the shaft 12. The arms 45 are wider than the arms 44 and are adapted to have the ears 42 of the rotated member 40—41 bear against that face of the arm 45 adjacent the arm 44. The ends of the arm 44 carry contact points 49 and the ends of the arm 45 carry contact points 50 for making and breaking contact as hereinafter more fully explained.

A pair of collector rings 51, 52 are mounted on and insulated from each other and from the shaft 12, for contact with brushes 53, 54, respectively, each mounted in a bracket 55 projecting from opposite sides of a brush holder ring 56. The ring 56 is fixedly mounted in the casing 10 by the rods 33 and nuts 57.

In the wiring diagram, Fig. 12, the supply line 58 is controlled by the switch member 30 (Fig. 10) for moving the contact members 31 and 35 into and out of contact with each other. Said line 58, with interposed field coil 13 and armature 59, leads to the brush 53 which contacts the collector ring 51. The other line 60 leads from the brush 54, contacting the collector ring 52. The rings 51, 52 are electrically connected with the contact members 49, 50, respectively, on the centrifugally influenced arms 44, 45. Preferably a resistance shunt 61 and condenser 62 are connected across the conductors 58 and 60.

Operation.—The user of the food mixer or other apparatus in which the motor is embodied moves the indicator 30 to desired position, as, for example, that designated "1" in Fig. 9, whereby the contact member 31 on the indicator disc 28 is made to contact the contact members 35, 35 on the fixed ring 32, allowing current to flow to the motor. The manual actuation of the disc 28 by moving the indicator 30 from "0" to "1" also alters the position of the rotatable disc 21 and hub 19—20 by reason of the engagement of the ear 27 of the disc 21 with the indicator disc 28. As explained, the axial position of the hub 19—20 is controlled by the relative positions of the inclined surfaces 18 and 23 of the fixed disc 16 and rotatable disc 21, respectively. At low speed, indicated by "1", the discs 16 and 21 are in the relative positions shown in Figs. 1 to 9, inclusive; that is, the hub part 20 and disc 21 are axially toward the right or armature end of the shaft 12, so that the bearing sleeve 38 of said hub part 20 bears against the washer 36 and disc 40—41 to the greatest extent possible in the operative relation of the parts. The result is that the disc 40—41 is also moved axially toward the right and the ears 42 of the disc 40—41 exert considerable pressure on opposite ends of the arm 45 against which they bear, thereby bending the arms 45 slightly in a direction away from the arms 44, but not to such an extent that contact is broken between the points 49 and 50. However, the adjusted position of the arm 45 is such that, under centrifugal influence resulting from rotation of the speed control assembly with the shaft 12, the arm 44 readily tends to straighten, radially, as shown by dotted lines in Fig. 9, and intermittently break the contact between the points 49 and 50 whenever the speed of the motor shaft exceeds the predetermined speed, as is the case when operating under light load.

In Fig. 10 the indicator 30 points to the high speed designation "3". In that position the indicator disc 28 and associated disc 21 on the hub 19—20 are axially toward the left of the shaft 12 to the greatest possible extent, the inclined surfaces 18 and 23 of the discs 16 and 21 being so disposed that said discs are as close together as possible. In this relationship the edge 24 of the inclined surface 23 of the disc 21 is opposite the part 25 of the inclined surface 18 of the fixed disc 16, which permits the disc 21 to recede toward the disc 16 and end wall 14 to the greatest extent. Consequently the hub member 20 is axially more toward the left of the shaft 12 than it is in the low speed position of Fig. 9, and the bearing sleeve 38 of said hub 20, lightly bearing on the washer 36 and loosely mounted disc 40—41, causes the ears 42 of the said disc 40—41 to exert less pressure on the spring arm 45 than they do in the low speed positions of the parts.

This is shown by comparison of Figs. 9 and 10, in which the hub 20 and disc 40 with attached ring 41 and ears 42 are in slightly different positions and consequently the ends of the spring arm 45 are flexed in a direction away from the arm 44 to a greater degree in Fig. 9 than in Fig. 10. Therefore, in the high speed position, the breaking of the contact between the points 49 and 50, due to centrifugal influence on the free arm 44, occurs only when the speed of rotation of the motor shaft exceeds the predetermined high speed. Because of the difference in the bearing positions of the ears 42 on the spring arm 45, depending on the position of the indicator 30 and consequent adjustment of the parts 21, 20 and 40—41, the position of the arm 45 is varied and the contact between the points 49 and 50 is more easily broken at speeds exceeding the predetermined maximum for low speed operation than at speeds exceeding the predetermined maximum for high speed operation.

In food mixers having a worm on the end of the shaft 12 for meshing with gears on the beater shafts, backward thrust of the motor shaft is produced by the working of the worm in the gears. Therefore, a thrust bearing is provided at the commutator end of the shaft and this bearing (not shown) serves also as a means for adjusting the armature shaft so that there will be practically no longitudinal movement of the shaft under load, freedom from such movement being essential on account of the minute adjustments of parts movable longitudinally of the shaft required for proper functioning of the speed control.

Since the spring arms 44 and 45 which carry the contact points extend in balanced relation in opposite directions from the shaft and operate to make and break contact by movements substantially parallel with the axis of the shaft, the motor is in balance at all speeds, and capable of operating at a wide range of controlled speeds. This result cannot be obtained when the movable contact carrying arm operates at right angles to the shaft, for such action unbalances the motor and limits the range of speeds within which the controlling mechanism will function.

Changes may be made in details of construction without departing from the scope of my invention and I do not intend to be limited to the exact form shown and described, except as set forth in the appended claims.

I claim:

1. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends on the motor shaft to rotate with the shaft, electrical contact members on the ends of each arm, the contacts on one arm being normally in contact with those on the other arm and separable by movement in a direction substantially parallel with the motor shaft, produced by the centrifugal force generated when the motor shaft exceeds a predetermined speed, and manually operable means for varying the tendency of the arms to separate under the influence of centrifugal force.

2. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends on the motor shaft to rotate with the shaft, electrical contact members on the ends of each arm, the contacts on one arm being normally in contact with those on the other arm and separable by movement in a direction substantially parallel with the motor shaft, produced by the centrifugal force generated when the motor shaft exceeds a predetermined speed, and manually operable means for varying the tendency of the arms to separate under the influence of centrifugal force, said manually operable means comprising an axially movable member loosely mounted on the motor shaft, rotatable with and engaging the breaker mechanism, an indicator, and an indicator-actuated, axially movable member bearing against said rotatable breaker-engaging member for transmitting predetermined pressure against said breaker-engaging member.

3. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends on the motor shaft to rotate with the shaft, electrical contact members at opposite ends of each arm, the median portions of said arms being spaced apart and insulated from each other, the contact-carrying ends of the arms converging to make contact between the proximate contacts and separating under influence of centrifugal force by movement in a direction substantially parallel with the motor shaft, and manually operable means for varying the tendency of the arms to separate under the influence of centrifugal force.

4. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends on the motor shaft to rotate with the shaft, electrical contact members at opposite ends of each arm, the median portions of said arms being spaced apart and insulated from each other, the contact-carrying ends of the arms converging to make contact between the proximate contacts and separating under influence of centrifugal force by movement in a direction substantially parallel with the motor shaft, and manually operable means for varying the tendency of the arms to separate under the influence of centrifugal force, said manually operable means comprising an axially movable member loosely mounted on the motor shaft, rotatable with and engaging the breaker mechanism, an indicator, and an indicator-actuated, axially movable member bearing against said rotatable breaker-engaging member for transmitting predetermined pressure against said breaker-engaging member.

5. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends in spaced, insulated relation on the motor shaft to rotate with the shaft, one of said arms having end portions radially inclined toward the other arm, contact members on the proximate faces of said arms near their ends, said inclined ends of one of said arms being separable from the other arm by centrifugal force by movement in a direction substantially parallel with the motor shaft, and manually operable means for varying the tendency of the arms to separate under the influence of centrifugal force.

6. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends in spaced, insulated relation on the motor shaft to rotate with the shaft, one of said arms having end portions radially inclined toward the other arm, contact members on the proximate faces of said arms near their ends, said inclined ends of one of said arms being separable from the other arm by centrifugal force by movement in a direction substantially parallel with the motor shaft, and manually operable means for adjusting the position of said last mentioned arm for varying the tendency of said inclined ends of the other arm to separate from the adjusted arm.

7. A motor and speed controller comprising a motor casing, a motor shaft rotatably journaled in the casing, breaker mechanism fixedly mounted on and rotatable with the shaft, said breaker mechanism comprising a pair of resilient arms, each arm extending radially in opposite directions from the shaft, and contact members near the ends of each arm, said contact members being separable by movement in a direction substantially parallel with the motor shaft, an axially movable disc provided with ears for engaging one of said resilient arms, means for rotating the disc with the breaker mechanism, an indicator, and an axially movable member controlled by the indicator, normally non-rotated and bearing against the axially movable disc to vary the tendency of the arms to separate under the influence of centrifugal force.

8. A motor and speed controller comprising a motor casing, a motor shaft rotatably journaled in the casing, breaker mechanism fixedly mounted on and rotatable with the shaft, said breaker mechanism comprising a pair of resilient arms, each arm extending radially in opposite directions from the shaft, and contact members near the ends of each arm, said contact members being separable by movement in a direction substantially parallel with the motor shaft, an axially movable disc provided with ears for engaging one of said resilient arms, means for rotating the disc with the breaker mechanism, an indicator, an axially movable member controlled by the indicator, normally non-rotated and bearing against the axially movable disc to vary the tendency of the arms to separate under the influence of centrifugal force, a brush-holder ring fixedly mounted in the casing, a pair of collector rings rotatable with the breaker mechanism, and brushes carried by the brush-holder for contacting with the collector rings.

9. The combination with an electric motor, of a speed controller comprising centrifugally operated breaker mechanism for automatically maintaining the speed of the motor shaft at any one of a plurality of predetermined speeds within the power of the motor, said breaker mechanism comprising a pair of resilient arms each mounted midway between its ends on the motor shaft to rotate with the shaft, electrical contact members on the ends of each arm, the contacts on one arm being normally in contact with those on the other arm and separable by centrifugal force by movement in a direction substantially parallel with the motor shaft, and manually operable means for varying the tendency of the arms to separate under the influence of centrifugal force.

EMANUEL NIELSEN.